(12) United States Patent
Sato

(10) Patent No.: US 8,106,648 B2
(45) Date of Patent: Jan. 31, 2012

(54) NON-CONTACT ROTATIONAL ANGLE DETECTING SENSOR

(75) Inventor: Shunichi Sato, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 718 days.

(21) Appl. No.: 12/289,876

(22) Filed: Nov. 6, 2008

(65) Prior Publication Data

US 2009/0146649 A1     Jun. 11, 2009

(30) Foreign Application Priority Data

Dec. 11, 2007    (JP) ................................. 2007-320167

(51) Int. Cl.
*G01B 7/30*     (2006.01)
(52) U.S. Cl. ................... 324/207.25; 324/174
(58) Field of Classification Search .............. 324/174, 324/207.25
See application file for complete search history.

(56) References Cited

U.S. PATENT DOCUMENTS

2004/0164733 A1*   8/2004   Fukaya et al. ............ 324/207.25
2004/0217757 A1*   11/2004   Tromblee .................... 324/207.2

* cited by examiner

*Primary Examiner* — Bot Ledynh
(74) *Attorney, Agent, or Firm* — Rader, Fishman & Grauer PLLC

(57) ABSTRACT

There is provided a non-contact rotational detecting sensor comprising a ring-shaped permanent magnet which rotates integrally with a detection object of a rotational angle and of which a magnetic pole changes along the circumferential direction, a ring-shaped inside magnetic flux collecting yoke for surrounding an outer peripheral surface of the ring-shaped permanent magnet in a constant gap, a ring-shaped outside magnetic flux collecting yoke for surrounding an outer peripheral surface of the ring-shaped inside magnetic flux collecting yoke in a constant gap, and a hole IC arranged in a gap formed in the ring-shaped inside magnetic flux collecting yoke, wherein an axial height of the ring-shaped inside magnetic flux collecting yoke is changed along a circumferential direction of the ring-shaped inside magnetic flux collecting yoke.

37 Claims, 12 Drawing Sheets

(a)

(b)

(c)

(a)

(b)

(a)

(b)

(a)

(b)

(a)

(b)

(a)

(b)

ically responsive element which can be structured to be downsized and has no possibility of a contact failure caused by foreign matters. For example, such a detecting sensor is a rotational angle detecting sensor of a non-contact type suitable for detecting a depressing angle of an accelerator pedal in a vehicle or detecting a rotational angle of a shaft rotating in response to an operation of a shift lever thereof.

NON-CONTACT ROTATIONAL ANGLE DETECTING SENSOR

CROSS-REFERENCE TO RELATED APPLICATION

This application claims priority under 35 USC 119 from Japanese Patent Application No. 2007-320167, the disclosure of which is incorporated by reference herein.

BACKGROUND OF THE INVENTION

1. Field of the Invention

The present invention relates to a non-contact rotational angle detecting sensor using a magnetically responsive element.

2. Description of Related Art

There is provided a non-contact rotational angle detecting sensor using a magnetically responsive element which can be structured to be downsized and has no possibility of a contact failure caused by foreign matters. For example, such a detecting sensor is a rotational angle detecting sensor of a non-contact type suitable for detecting a depressing angle of an accelerator pedal in a vehicle or detecting a rotational angle of a shaft rotating in response to an operation of a shift lever thereof.

For example, Japanese Patent Laid-Open Publication No. 5-505883 discloses the conventional art of such a non-contact rotational angle detecting sensor.

The conventional non-contact rotational angle detecting sensor 100 as shown in Japanese Patent Laid-Open Publication No. 5-505883 is constructed so that, as shown in FIG. 12, a ring-shaped permanent magnet 103 is attached through a back yoke 102 to a shaft (rotating element) 101 which is a detection object of a rotational angle, and a magnetic flux collecting yoke 104 is provided so as to surround an outer peripheral surface of the ring-shaped permanent magnet 103 at a constant gap.

The conventional non-contact rotational angle detecting sensor 100 detects a change of the magnetic field due to the ring-shaped permanent magnet 103 when the rotational element 101 rotates, by a hole IC 106 and detects a rotational angle of the rotational element 101 based upon the change of the detected magnetic field.

SUMMARY OF THE INVENTION

However, since the ring-shaped permanent magnet 103 is magnetized in such a manner that the magnetic pole changes along the circumferential direction of the magnet 103, when the detection range is more than a predetermined range, for example, 90 degrees or more, the linearity (output accuracy) of the magnet 103 deteriorates due to characteristics of a magnetic waveform (waveform of surface magnetic flux density). This problem is thought to be caused by the following event. That is, as the detection range is shifted out of the predetermined range, an amount of the magnetic flux passing through the hole IC 106 increases the furthermore to force a changing rate of the magnetic flux in the hole IC 106 to be relatively small. Namely, a magnetic flux changing amount per unit angle is not constant (the changing amount changes).

Examples of the measure for coping with this problem include ways of forming the magnetic flux collecting yoke to be in an elliptic shape or changing the gap between the magnetic flux collecting yoke and the ring-shaped permanent magnet, but this is just the theoretical measure. Considering variations in the manufacture or mechanical gaps in a product, it is technically difficult to practically apply this measure to a case of a detecting sensor used for a vehicle mass production, for example.

In view of the above, there exists a need for a non-contact rotational angle detecting sensor which overcomes the above mentioned problems in the conventional art. The present invention addresses this need in the conventional art as well as other needs, which will become apparent to those skilled in the art from this disclosure.

Accordingly, the present invention has an object of providing a non-contact rotational angle detecting sensor which is excellent in linearity (output accuracy).

A non-contact rotational detecting sensor according to an aspect of the present invention comprises a ring-shaped permanent magnet which rotates integrally with a detected element and of which a magnetic pole changes along a circumferential direction of the permanent magnet, a ring-shaped first yoke for surrounding an outer peripheral surface of the ring-shaped permanent magnet in a constant gap, a ring-shaped second yoke for surrounding an outer peripheral surface of the first yoke in a constant gap, and a magnetically responsive element arranged in a gap formed in the first yoke, wherein an axial height of the first yoke changes along a circumferential direction of the first yoke.

Advantage of the Invention

According to the aspect of the present invention, a ratio of an amount of the magnetic flux passing through the gap to an amount of the magnetic flux not passing through the gap changes and also an amount itself of the magnetic flux flowing in the first yoke changes due to the circumferential change in the height of the first yoke. Therefore, the magnetically responsive element outputs a signal based upon the two changes, making it possible to obtain high linearity of the signal output to the rotational angle.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENT

Hereinafter, a non-contact rotational angle detecting sensor according to an embodiment of the present invention will be explained with reference to the accompanying drawings.

Figure 1:
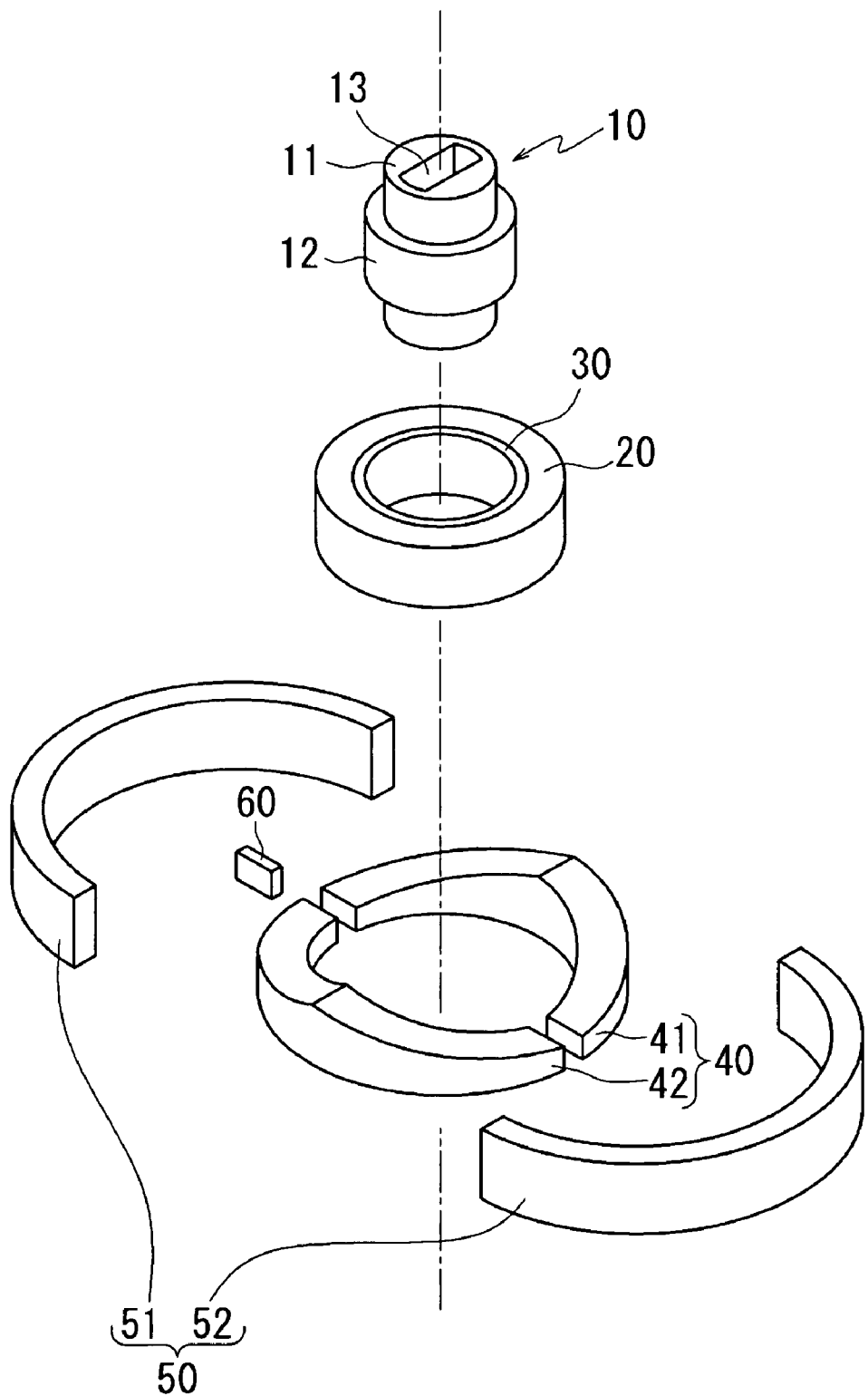
FIG. 1 is an exploded perspective view showing a non-contact rotational angle detecting sensor according to an embodiment of the present invention.
Figure 2:
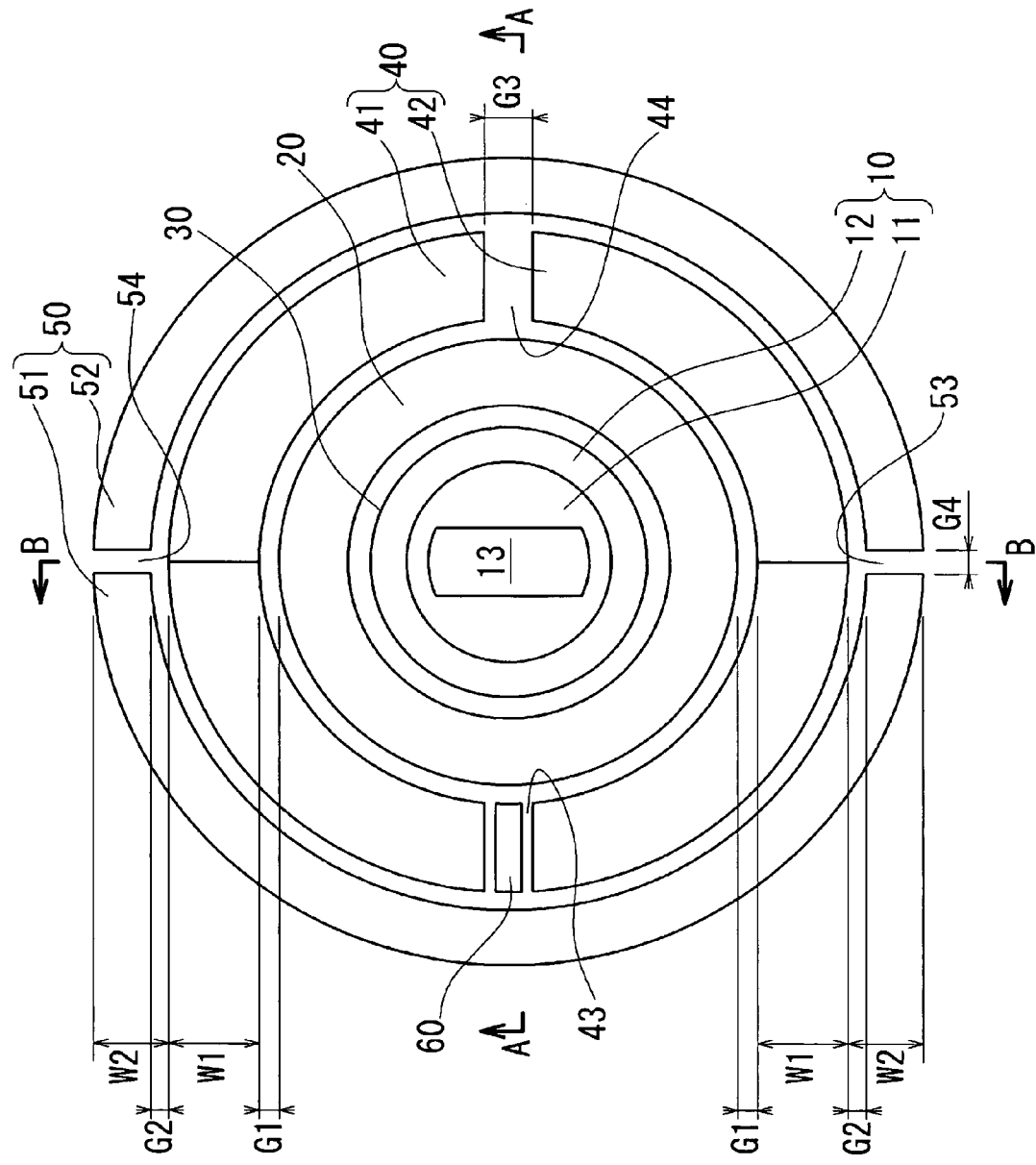
FIG. 2 is an explanatory diagram showing the non-contact rotational angle detecting sensor according to the embodiment of the present invention.
Figure 4:
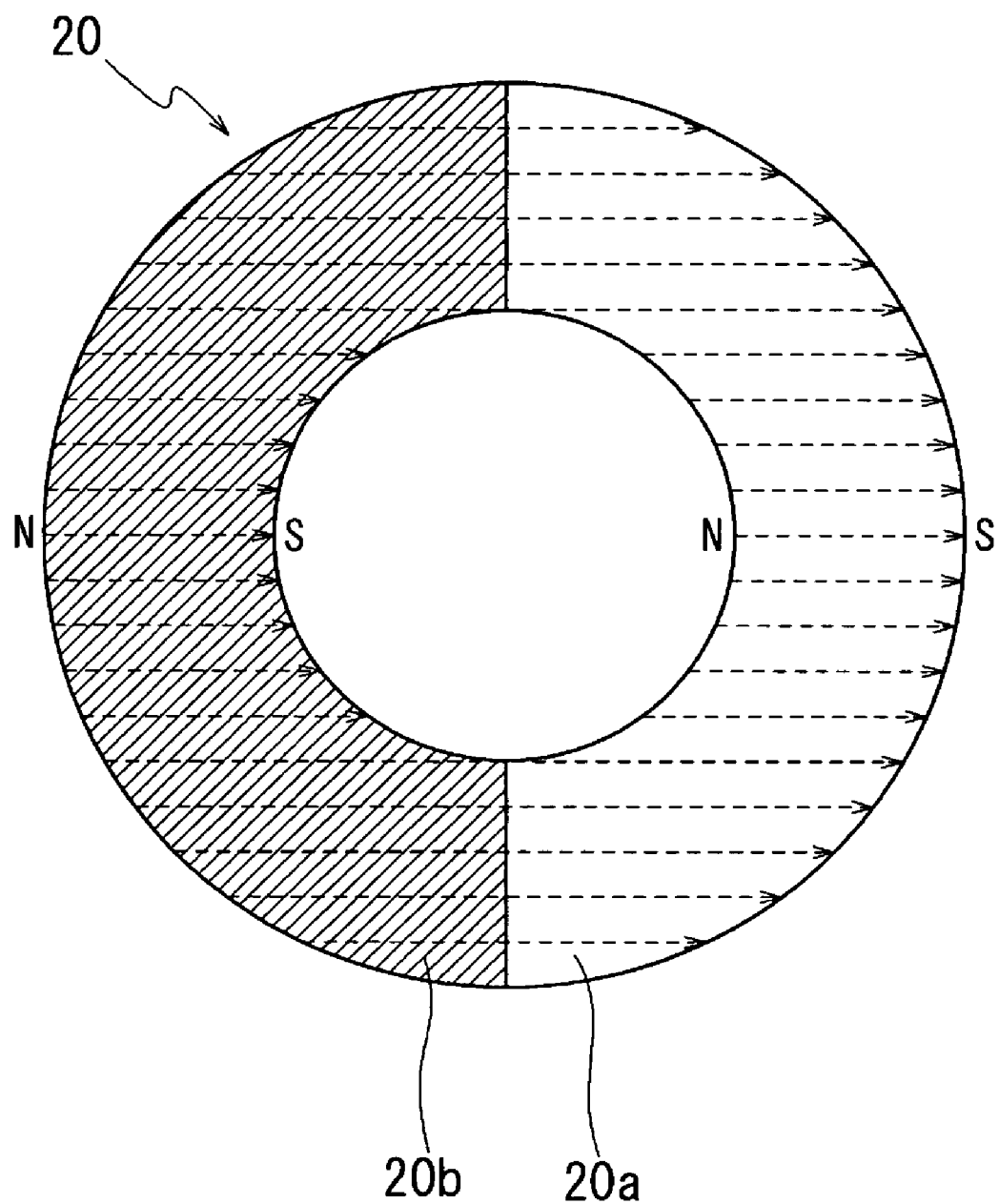
FIG. 4 is a diagram showing a ring-shaped permanent magnet of the rotational angle detecting sensor according to the embodiment of the present invention.
Figure 5:
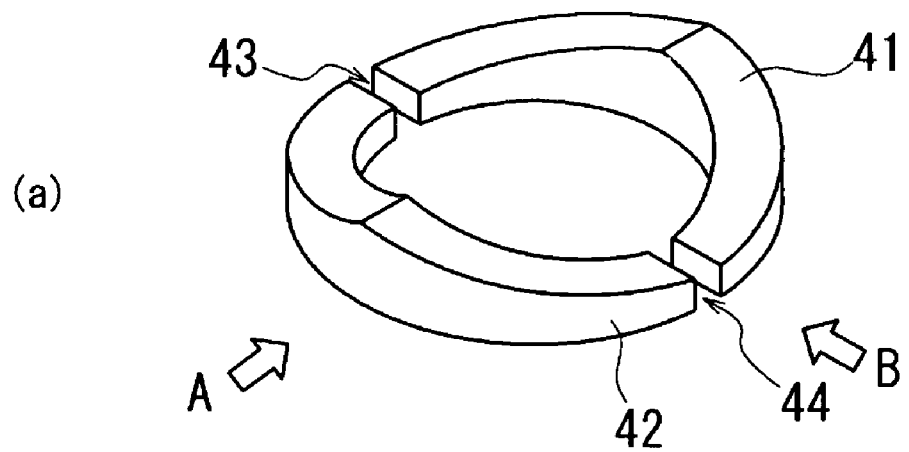
FIG. 5(A) is a perspective view showing an inside magnetic flux collecting yoke of the rotational angle detecting sensor according to the embodiment of the present invention.
FIG. 5(B) is a diagram showing a half of the inside magnetic flux collecting yoke of the rotational angle detecting sensor as viewed in a direction of an A arrow in FIG. 5(A)
FIG. 5(C) is a diagram showing the inside magnetic flux collecting yoke of the rotational angle detecting sensor as viewed in a direction of a B arrow in FIG. 5(A)
Figure 5:
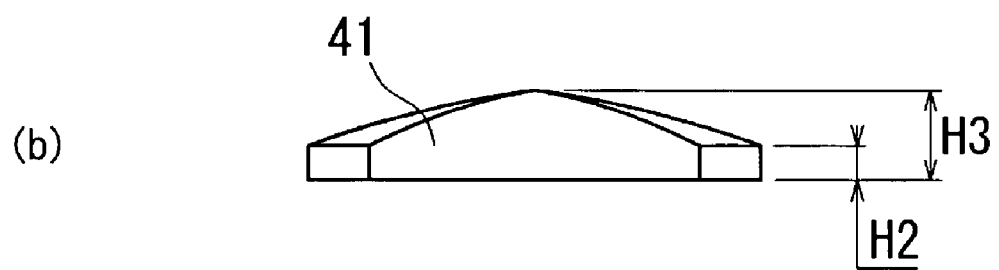
Figure 5:
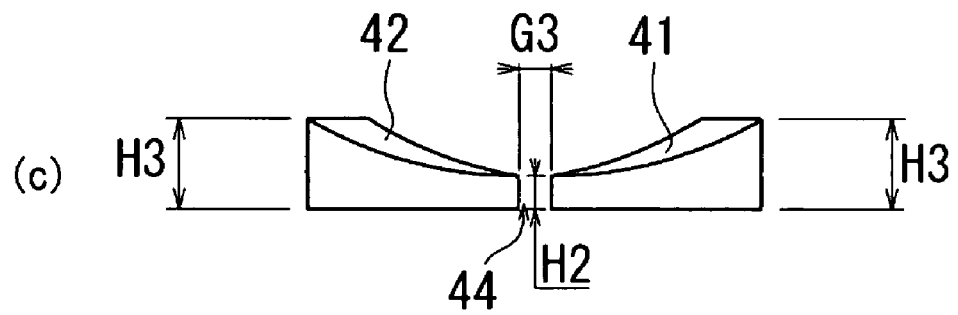

FIG. 1 is an exploded perspective view showing a non-contact rotational angle detecting sensor according to an embodiment. FIG. 2 is an explanatory diagram showing the non-contact rotational angle detecting sensor according to the embodiment and is a plan view as seen from above. FIG. 3(A) is a cross section taken along line A-A in FIG. 2 and FIG. 3(B) is a cross section taken along line B-B in FIG. 2. FIG. 4 is an enlarged diagram schematically showing a ring-shaped permanent magnet of the rotational angle detecting sensor according to the embodiment. FIGS. 5(A), 5(B) and 5(C) are diagrams each explaining an inside magnetic flux collecting yoke of the rotational angle detecting sensor according to the embodiment.

As shown in FIG. 1, the rotational angle detecting sensor is constructed of a rotor 10, a ring-shaped permanent magnet 20, a back yoke 30, an inside magnetic flux collecting yoke 40, an outside magnetic flux collecting yoke 50 and a hole IC 60.

The rotor 10 is constructed of a body portion 11 an out side appearance of which is formed in a columnar shape and a flange-shaped magnet retaining portion 12 extending in a diameter direction from an axial midpoint of the body portion 11 and is attached to a shaft (not shown) as a rotational element as a detection object.

The body portion 11 has a through hole 13 through which the shaft penetrates and a cross section of the through hole 13 has a width across flat portion in alignment with a cross section of an attachment portion in the shaft. Therefore, the rotor 10 rotates integrally with the shaft in a state where the attachment portion of the shaft is inserted therein.

The ring-shaped permanent magnet 20 has a ring shape as viewed from top and is attached through the back yoke 30 (ring-shaped soft magnetic element) fixed closely to an inner peripheral surface thereof to an outer peripheral surface of the magnet retaining portion 12 without a gap.

The back yoke 30 serves so as to restrict irreversible heat degauss of the permanent magnet to be small in a case where the rotational angle detecting sensor is installed in a place where the environment is in a high temperature and restrict the leak magnetic flux in an inside diameter direction of the permanent magnet.

As shown in FIG. 3(A) and FIG. 2, an axial height H1 of the ring-shaped permanent magnet 20 is equal to an axial height of each of the magnetic retaining portion 12 and the back yoke 30. Each of the axial height and a thickness in the diameter direction of the ring-shaped permanent magnet 20 is equal over the entire circumference.

As shown in FIG. 4, the ring-shaped permanent magnet 20 is divided into semicircles on the diameter line (at a position of 180° in the circumferential direction). One magnet semi-circle portion 20a is formed as having an S pole in the inner periphery side (side in contact with the back yoke 30) and an N pole in the outer periphery side. The other magnet semi-circle portion 20b is magnetized in parallel to one diameter line as having an S pole in the inner periphery side and an N pole in the outer periphery side. In consequence, the ring-shaped permanent magnet 20 has a two-pole structure in the circumferential direction as a whole as seen from one direction of the diameter directions.

Here, the ring-shaped permanent magnet 20 is obtained by parallel magnetization magnetizing it in parallel from one direction of the diameter direction. Therefore, a material of the ring-shaped permanent magnet 20 is not limited to an anisotropic magnet, but may select an isotropic magnet. In the present embodiment, the isotropic magnet which can be formed more inexpensively is adopted.

Figure 3:
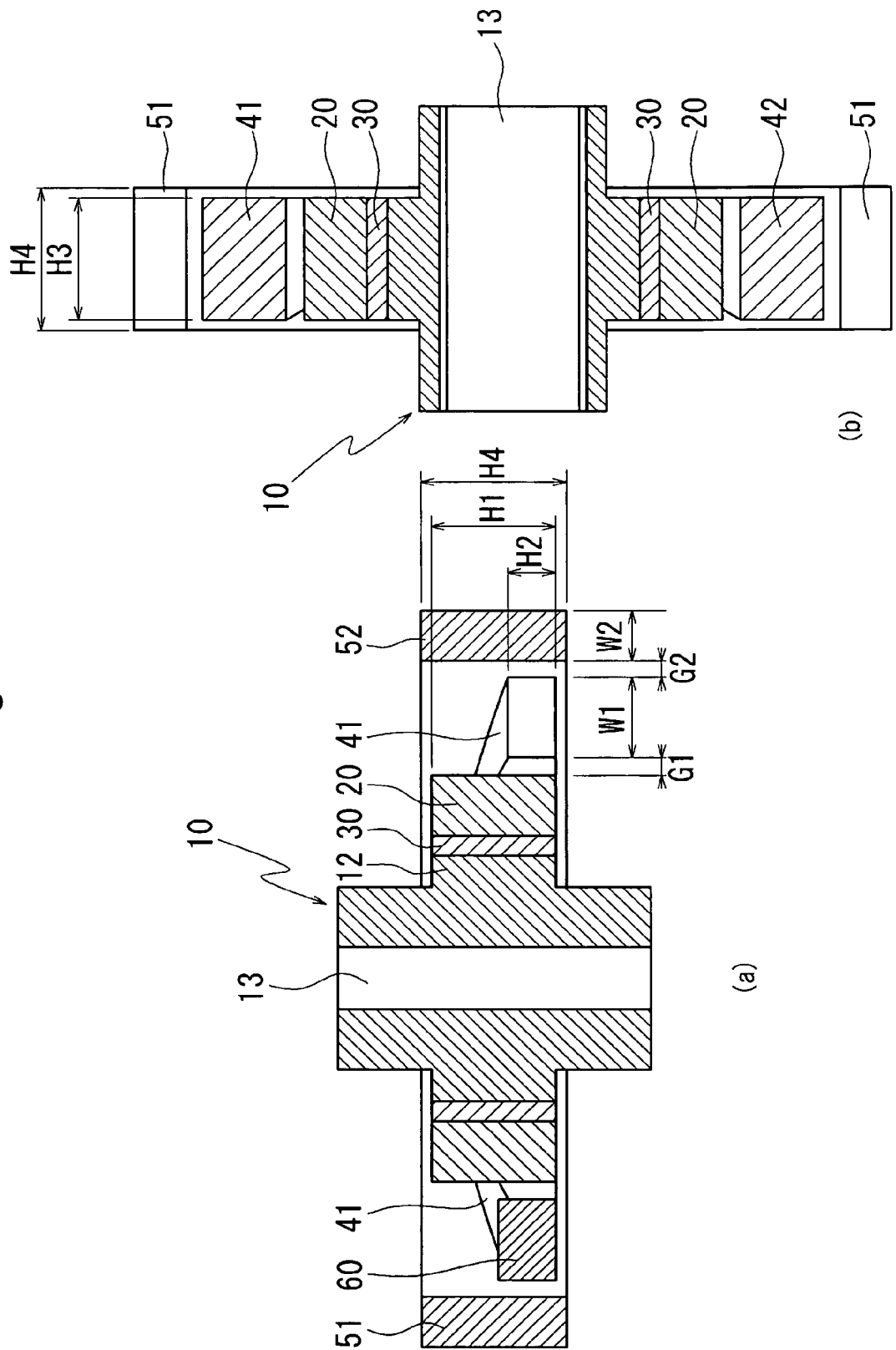
FIG. 3(A) is a cross section taken along line A-A in FIG. 2.
FIG. 3(B) is a cross section taken along line B-B in FIG. 2.

As shown in FIGS. 2 and 3, a stationary-side yoke formed of the inside magnetic flux collecting yoke 40 and the outside magnetic flux collecting yoke 50 is attached to a stationary side relative to the shaft so as to surround the ring-shaped permanent magnet 20 attached to the rotor 10.

The inside magnetic flux collecting yoke 40 and the outside magnetic flux collecting yoke 50 are arranged on two coaxial circles having different diameters which have a center of the ring-shaped permanent magnet 20 as a common center in a plane configuration as viewed from the axial direction and each thereof is made of a pure iron-based soft magnetic material.

The inside magnetic flux collecting yoke 40 is arranged so as to surround the ring-shaped permanent magnet 20 as having a predetermined gap G1 from the outer periphery surface of the ring-shaped permanent magnet 20, and is constructed of a first inside magnetic flux collecting yoke 41 and a second inside magnetic flux collecting yoke 42.

It should be noted that in the following explanation, in a case of not distinguish the first inside magnetic flux collecting yoke 41 over the second inside magnetic flux collecting yoke 42, the first inside magnetic flux collecting yoke 41 and the second inside magnetic flux collecting yoke 42 are collectively expressed by the inside magnetic flux collecting yoke 40.

Each of the first inside magnetic flux collecting yoke 41 and the second inside magnetic flux collecting yoke 42 is formed in a plane configuration as viewed form the axial direction having the same semicircular shape and is arranged as opposed to each other through gaps 43 and 44 each having a predetermined width G3.

The first inside magnetic flux collecting yoke 41 and the second inside magnetic flux collecting yoke 42 can be obtained by dividing the ring-shape yoke having a predetermined width W1 as viewed from the axial direction into two pieces on the diameter line (position of 180° in the circumferential direction) and the gaps 43 and 44 are formed by cutting down the circumferential opposing surfaces between the two semicircles obtained by the division.

The outside magnetic flux collecting yoke 50 is arranged so as to surround the inside magnetic flux collecting yoke 40 as having a predetermined gap G2 from the outer periphery surface of the inside magnetic flux collecting yoke 40, and is constructed of a first outside magnetic flux collecting yoke 51 and a second outside magnetic flux collecting yoke 52.

It should be noted that in the following explanation, in a case of not distinguish the first outside magnetic flux collecting yoke 51 over the second outside magnetic flux collecting yoke 52, the first outside magnetic flux collecting yoke 51 and the second outside magnetic flux collecting yoke 52 are collectively expressed by the outside magnetic flux collecting yoke 50.

Each of the first outside magnetic flux collecting yoke 51 and the second outside magnetic flux collecting yoke 52 is formed in a plane configuration as viewed form the axial direction having the same semicircular shape and is arranged as opposed to each other through gaps 53 and 54 each having a predetermined width G4.

The first outside magnetic flux collecting yoke 51 and the second outside magnetic flux collecting yoke 52 can be obtained by dividing the ring-shape yoke having a predetermined width W2 as viewed from the axial direction into two pieces on the diameter line (position of 180° in the circumferential direction) and the gaps 53 and 54 are formed by cutting down the circumferential opposing surfaces between the two semicircles obtained by the division.

The inside magnetic flux collecting yoke 40 and the outside magnetic flux collecting yoke 50 are arranged so that a line component connecting the gaps 43 and 44 of the inside magnetic flux collecting yoke 40 intersects a line component connecting the gaps 53 and 54 of the outside magnetic flux collecting yoke 50 in a predetermined angle (cross at right angles). The gaps 43 and 44 of the inside magnetic flux collecting yoke 40 and the gaps 53 and 54 of the outside magnetic flux collecting yoke 50 are arranged at positions offset from each other in the circumferential direction as viewed from the axial direction. In a case of viewing the rotational angle detecting sensor from the circumferential direction side, by preventing that the ring-shaped permanent magnet 20 is seen through the gap, the leak of the magnetic flux through the gap to an outside of the rotational angle detecting sensor can be prevented.

Therefore, in the present embodiment, the gaps 43 and 44 are arranged at positions offset to the gaps 53 and 54 by generally 90° around the rotational axis of the rotor 10, so that the spaced distances in the circumferential direction between the gaps 43 and 44, and the gaps 53 and 54 are respectively maximized.

As shown in FIGS. 5(A), 5(B) and 5(C), the axial height of the inside magnetic flux collecting yoke 40 (41 and 42) changes along the circumferential direction so that it gets higher at a position more distant from the gaps 43 and 44.

The inside magnetic flux collecting yoke 40 (41 and 42) has a bottom surface which is a flat surface perpendicular to an axial direction of the rotational angle detecting sensor and an upper surface which is made to a slant surface. In consequence, each cross section in the circumferential direction of the inside magnetic flux collecting yoke 40 is made to a rectangular cross section a height of which changes.

The axial height H2 of both ends of the first inside magnetic flux collecting yoke 41 and the second inside magnetic flux collecting yoke 42 facing the gaps 43 and 44 is set in such a manner as to be lower than the axial height H3 of the central portion (H2<H3) and higher at a position more distant from the gaps 43 and 44.

As shown in FIGS. 3(A) and 3(B), the axial height H4 of the outside magnetic flux collecting yoke 50 (51 and 52) is the same (constant) along the circumferential direction and is set higher than the axial maximum height H3 of the inside magnetic flux collecting yoke 40 (H3<H4), so that the ring-shaped permanent magnet 20 and the inside magnetic flux collecting yoke 40 are accommodated inside the height H4 of the outside magnetic flux collecting yoke 50.

It should be noted that the lower surface and the top surface of the outside magnetic flux collecting yoke 50 constitute flat surfaces perpendicular to the axial direction and a thickness in the diameter direction of the outside magnetic flux collecting yoke 50 is the same over the entire circumference (constant).

Each height H2 and H3 of the inside magnetic flux collecting yoke 40 and the height H4 of the outside magnetic flux collecting yoke 50 are set to optimal values based upon the result of the experimental measurement.

In addition, a width W1 of the inside magnetic flux collecting yoke 40 and a width W2 of the outside magnetic flux collecting yoke 50 are set to the extent that the magnetic flux is not satisfied inside the magnetic flux collecting yoke in consideration of permeability of a material constituting the magnetic flux collecting yoke and the magnetic flux density of the ring-shaped permanent magnet 20.

Here, a relation between the spaced gap G1 of the inside magnetic flux collecting yoke 40 from the outer periphery surface of the ring-shaped permanent magnet 20 and the spaced gap G2 of the outside magnetic flux collecting yoke 50 from the outer periphery surface of the inside magnetic flux collecting yoke 40 is preferably determined to meet a relation of the following formula (1).

$$G2/G1 \leq 2, G2>0 \qquad (1)$$

The reason is as follows. When a value of G2/G1 is larger than 2, the magnetic flux amount flowing via the outside magnetic flux collecting yoke 50 from the inside magnetic flux collecting yoke 40 is reduced and the magnetic flux does not nearly flow in the outside magnetic flux collecting yoke 50. Therefore, the effect by correction of the output accuracy can not be obtained.

Further, when the spaced gap G2 is 0 mm and the inside magnetic flux collecting yoke 40 is in contact with the outside magnetic flux collecting yoke 50, the magnetic flux amount flowing via the outside magnetic flux collecting yoke 50 from the inside magnetic flux collecting yoke 40 is increased and the magnetic flux amount which passes through the inside magnetic flux collecting yoke 40 and is back to the ring-shaped permanent magnet 20 is remarkably small. In consequence, the output as a sensor can not be obtained.

The hole IC 60 of a linear output type as a magnetically responsive element is installed in at least one of the gaps 43 and 44 between the first inside magnetic flux collecting yoke 41 and the second inside magnetic flux collecting yoke 42 and outputs a signal in accordance with an amount of the magnetic flux passing through the hole IC 60.

It should be noted that in a case of installing the hole IC 60 at both of the gaps 43 and 44, each hole IC 60 may output a signal with the same phase to each other or a signal with the reverse phase to each other.

Figure 6:
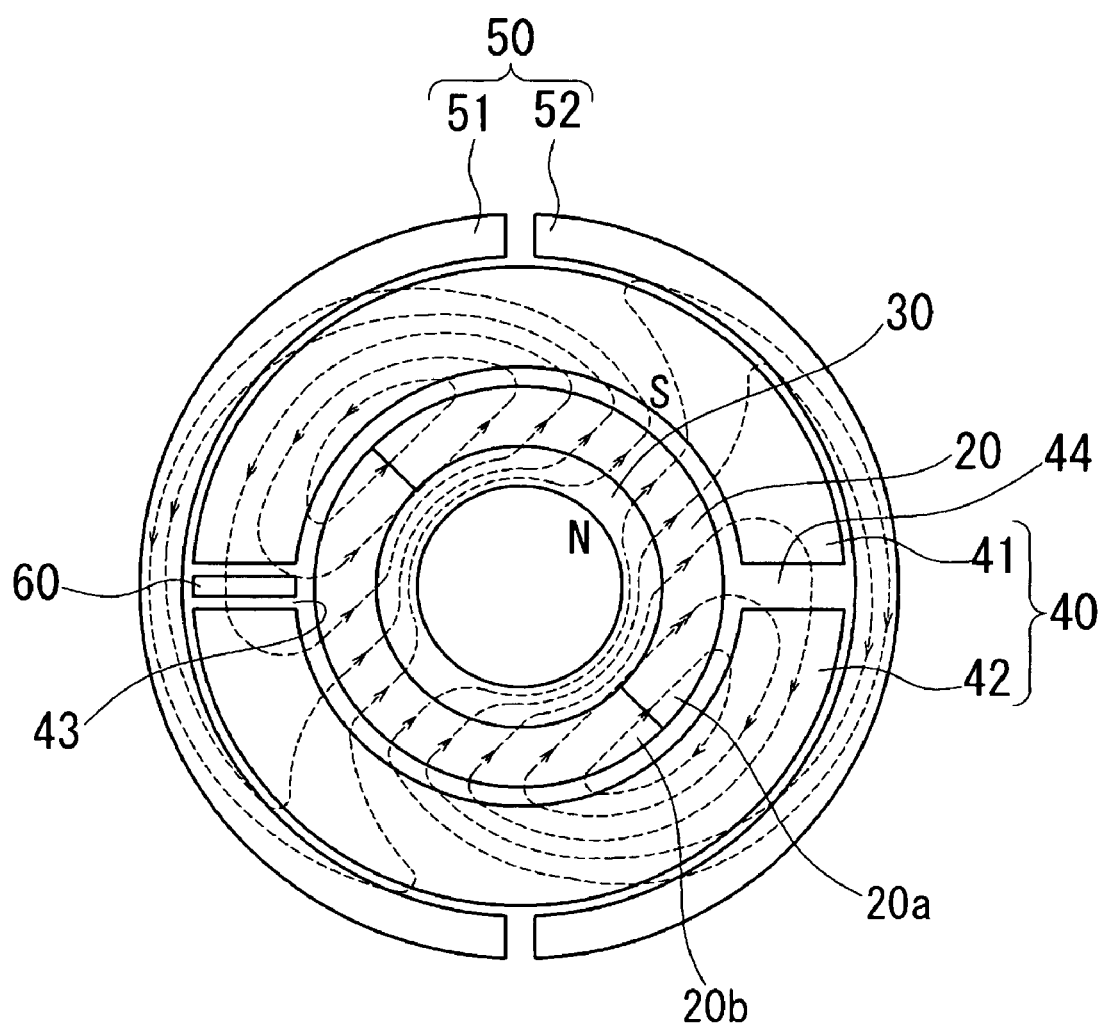
FIG. 6 is a diagram explaining the flow of magnetic flux in the rotational angle detecting sensor according to the embodiment of the present invention.

FIG. 6 is a schematic diagram showing the flow of the magnetic flux in the rotational angle detecting sensor according to the embodiment, and the flow of the magnetic flux in a case where the ring-shaped permanent magnet 20 is at a position of minus 45 degrees. Here, a position of the ring-shaped permanent magnet 20 in a case where a line component at right angles to a line component connecting the opposing surfaces of ends of the magnet semicircle portions 20a and 20b in the ring-shaped permanent magnet 20 is at positions passing through the gaps 43 and 44 of the inside magnetic flux collecting yoke 40 is made to 0 degrees, and a position the ring-shaped permanent magnet 20 where the ring-shaped permanent magnet 20 rotates by about 45° in the counterclockwise direction from this state is made to minus 45 degrees.

In the rotational angle detecting sensor constructed as described above, the magnetic flux generated from the ring-shaped permanent magnet 20 flows toward the inside magnetic flux collecting yoke 40 as shown in FIG. 6. The magnetic flux collected in the inside magnetic flux collecting yoke 40 is divided into two pieces of the magnetic flux, one passing through the inside magnetic flux collecting yoke 40 and being back to the ring-shaped permanent magnet 20 as it is, and the other flowing via the outside magnetic flux collecting yoke 50 back to the ring-shaped permanent magnet 20.

When the ring-shaped permanent magnet 20 rotates with the rotor 10, among the magnetic flux passing through the inside magnetic flux collecting yoke 40 and being back to the ring-shaped permanent magnet 20 as it is, an amount of the magnetic flux passing through the gap 43 where the hole IC 60 is installed and an amount of the magnetic flux not passing through the gap 43 change.

For example, when the ring-shaped permanent magnet 20 further rotates in the left side from the position shown in FIG. 6, an amount of the magnetic flux passing through the gap 43 increases and the hole IC 60 provides the output based upon the increased amount of the magnetic flux passing through the gap 43.

Here, in the present embodiment, since the axial height of the inside magnetic flux collecting yoke 40 changes along the circumferential direction so as to be higher at a position more distant from the gaps 43 and 44, the central portion of each of the first and second inside magnetic flux collecting yokes 41 and 42 each having the semicircular shape has a wider opposing area to the outside magnetic flux collecting yoke 50 than the end of each side of the gaps 43 and 44.

Since the magnetic flux amount flowing from the inside magnetic flux collecting yoke 40 to the outside magnetic flux collecting yoke 50 has a proportional relation with a size of the opposing area per unit angle between the inside magnetic flux collecting yoke 40 and the outside magnetic flux collecting yoke 50, the magnetic flux amount flowing from the inside magnetic flux collecting yoke 40 via the outside magnetic flux collecting yoke 50 back to the ring-shaped permanent magnet 20 increases in a logarithmic function as the rotational angle of the ring-shaped permanent magnet 20 increases.

That is, a sum of the amounts of the magnetic flux passing through the inside magnetic flux collecting yoke 40 changes in accordance with the rotational angle of the ring-shaped permanent magnet 20. For example, as the rotational angle increases, the sum decreases and therefore, the hole IC 60 provides the output reflecting the sum of the amounts of the magnetic flux caused by rotation of the ring-shaped permanent magnet 20.

In a case where the height of the inside magnetic flux collecting yoke 40 is constant in the circumferential direction, the magnetic flux amount from the inside magnetic flux collecting yoke 40 via the outside magnetic flux collecting yoke 50 in crease linearly with rotation of the ring-shaped permanent magnet 20. However, when the height of the inside magnetic flux collecting yoke 40 changes along the circumferential direction as in the case of the present embodiment, the magnetic flux amount increases in a logarithmic function with rotation of the ring-shaped permanent magnet 20 (as the rotational angle of the ring-shaped permanent magnet 20 increases, an increasing rate is reduced). Therefore, among the magnetic flux passing through the inside magnetic flux collecting yoke 40 and being back to the ring-shaped permanent magnet 20 as it is, the present embodiment has an effect of correcting a changing ratio between an amount of the magnetic flux passing through the hole IC 60 and an amount of the magnetic flux not passing through the hole IC 60.

In this way, the hole IC 60 is supposed to provide the output reflecting a sum of the amount of the magnetic flux passing through the gap 43 of the inside magnetic flux collecting yoke 40 changing in accordance with the rotational angle of the ring-shaped permanent magnet 20 and the amount of the magnetic flux passing through the inside magnetic flux collecting yoke 40.

In consequence, by determining a value of the height (H2 and H3) changing in the circumferential direction of the inside magnetic flux collecting yoke 40 by an experiment measurement as needed, the output with an increasing linearity can be obtained.

Further, even if the rotational angle of the ring-shaped permanent magnet 20 is large to increase an amount of the magnetic flux passing through the hole IC 60, a sum of the magnetic flux passing through the inside magnetic flux collecting yoke 40 is made small. Therefore, a changing rate of the magnetic flux passing through the hole IC 60 is not relatively made small. Therefore, even if the rotational angle of the ring-shaped permanent magnet is large, it is possible to detect a change of the magnetic flux.

Figure 7:
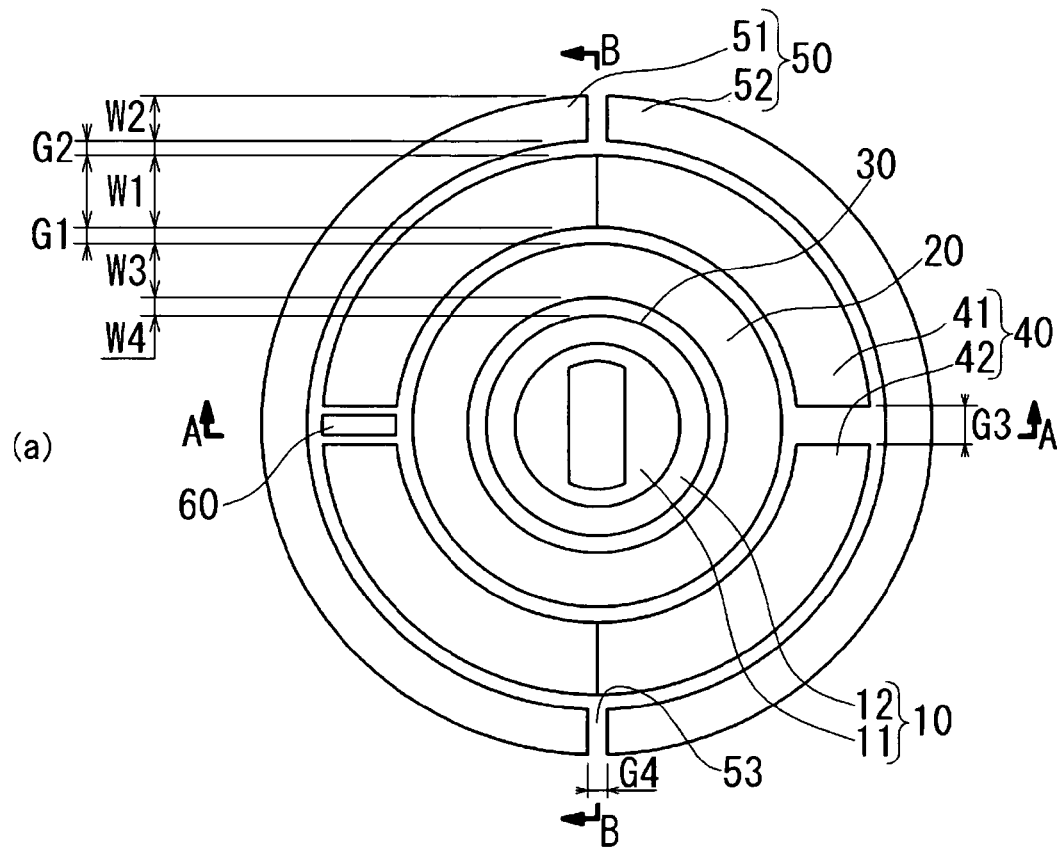
FIG. 7(A) is a diagram explaining the rotational angle detecting sensor according to the embodiment of the present invention.
FIG. 7(B) is a diagram explaining a rotational angle detecting sensor according to a comparative example.
Figure 7:
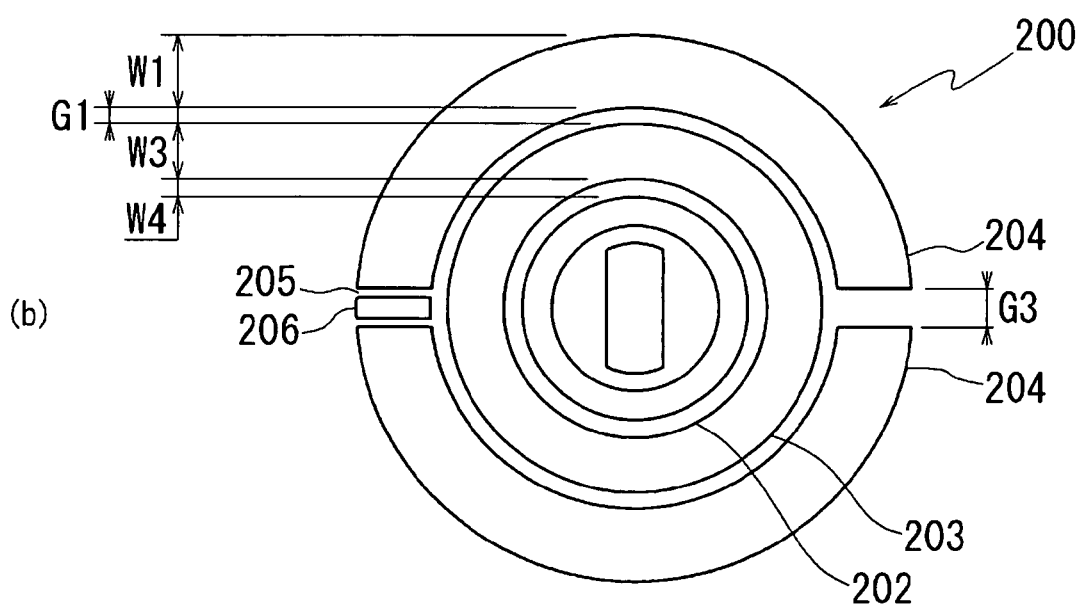

Hereinafter, by referring FIGS. 7(A) and 7(B), the effect of the rotational angle detecting sensor according to the embodiment will be explained by comparing the embodiment with a comparative example of a rotational angle detecting sensor 200.

Here, each portion of the rotational angle detecting sensor according to the embodiment used for comparison with the rotational angle detecting sensor 200 has the construction as described below (refer to FIG. 7(A)).

The ring-shaped permanent magnet 20 is an isotropic neodymium bond magnet (by molding neodymium, iron and boron powder with PPS resin) and has an inner diameter of 15.2 mm, an outer diameter of 19.6 mm, an axial rear height (H1) of 6.0 mm, a diameter direction width (W3) of 2.2 mm and a maximum surface magnetic flux density of 100 mT.

The back yoke 30 has an inner diameter of 13.2 mm, an outer diameter of 15.2 mm, an axial rear height of 6.0 mm, and a diameter direction width (W4) of 1.0 mm.

The inside magnetic flux collecting yoke 40 has an inner diameter of 22.0 mm, an outer diameter of 30.0 mm, an axial maximum height (H3) of 6.0 mm, an axial minimum height (H2) of 3.3 mm, a diameter direction width (W1) of 4.0 mm and a both-end-cutting down amount of 0.85 mm.

The outside magnetic flux collecting yoke 50 has an inner diameter of 32.0 mm, an outer diameter of 36.0 mm, an axial height (H4) of 7.0 mm, a diameter direction width (W2) of 2.0 mm and a both-end-cutting down amount of 0.5 mm.

It should be noted that the gap G1 between the ring-shaped permanent magnet 20 and the inside magnetic flux collecting yoke 40 is 1.2 mm, the gap G2 between the inside magnetic flux collecting yoke 40 and the outside magnetic flux collecting yoke 50 is 1.0 mm, the gap G3 between the first inside magnetic flux collecting yoke 41 and the second inside magnetic flux collecting yoke 42 is 1.7 mm and the gap G4 between the first outside magnetic flux collecting yoke 51 and the second outside magnetic flux collecting yoke 52 is 1.0 mm.

On the other hand, the rotational angle detecting sensor 200 according to the comparative example has the following construction. The ring-shaped permanent magnet 203 is an isotropic neodymium bond magnet (by molding neodymium, iron and boron powder with PPS resin) and has an inner diameter of 15.2 mm, an outer diameter of 19.6 mm, an axial rear height of 6.0 mm, a diameter direction width (W3) of 2.2 mm and a maximum surface magnetic flux density of 100 mT.

The back yoke 202 has an inner diameter of 13.2 mm, an outer diameter of 15.2 mm, an axial rear height of 6.0 mm, and a diameter direction width (W4) of 1.0 mm.

The magnetic flux collecting yoke 204 has an inner diameter of 22.0 mm, an outer diameter of 30.0 mm, an axial height of 6.0 mm, a diameter direction width (W1) of 4.0 mm and a both-end-cutting down amount of 0.85 mm.

It should be noted that the gap G1 between the ring-shaped permanent magnet 203 and the magnetic flux collecting yoke 204 is 1.2 mm, the gap G3 of the magnetic flux collecting yoke 204 is 1.7 mm.

Figure 8:
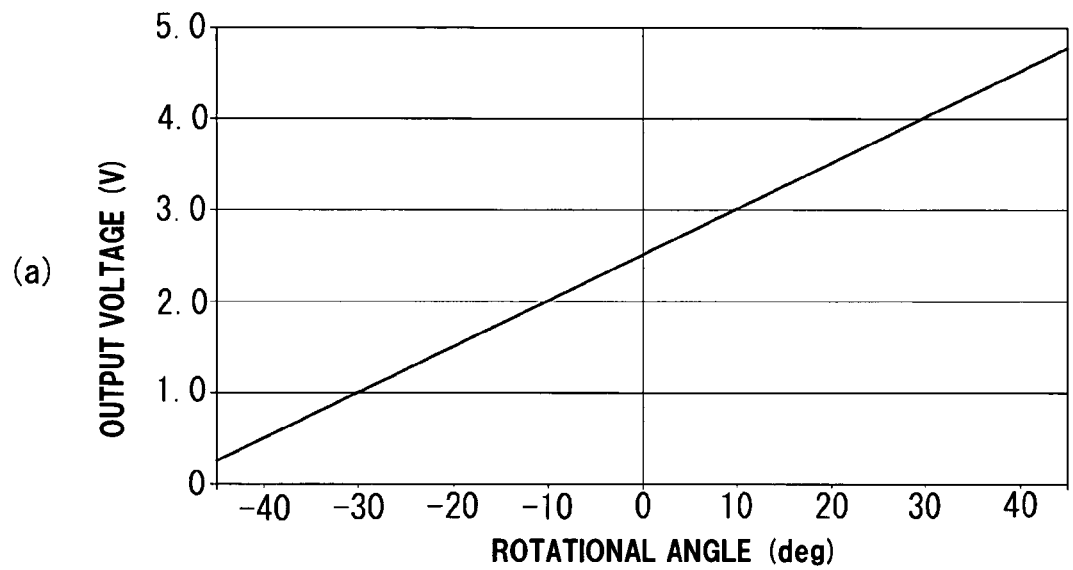
FIG. 8(A) is a graph explaining an output characteristic, that is, a relation between a rotational angle and an output voltage of the rotational angle detecting sensor according to the embodiment of the present invention.
FIG. 8(B) is a graph explaining an output characteristic, that is, a relation between a rotational angle and a linearity error of the rotational angle detecting sensor according to the embodiment of the present invention.
Figure 8:
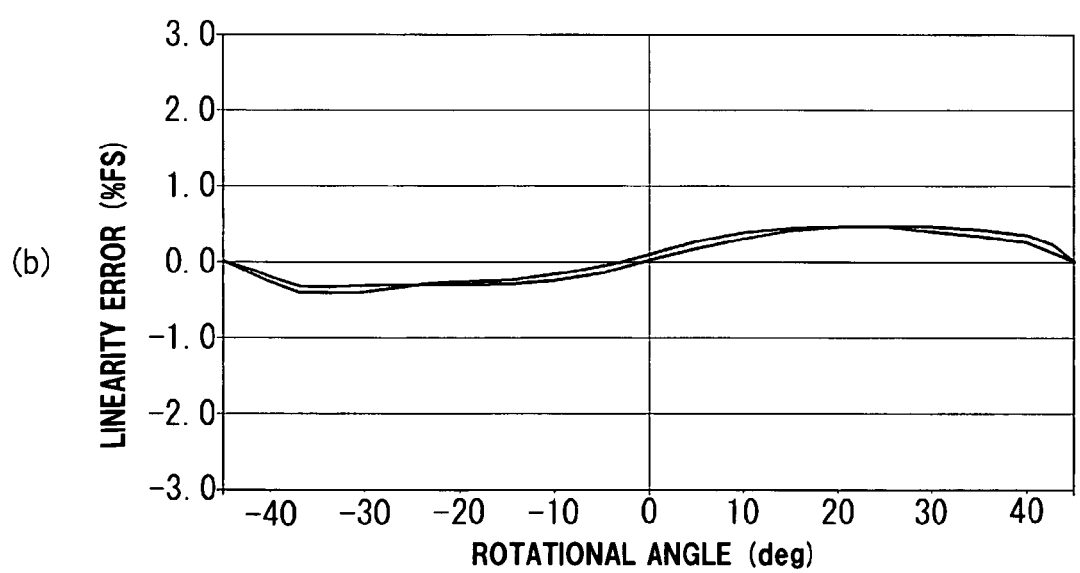
Figure 9:
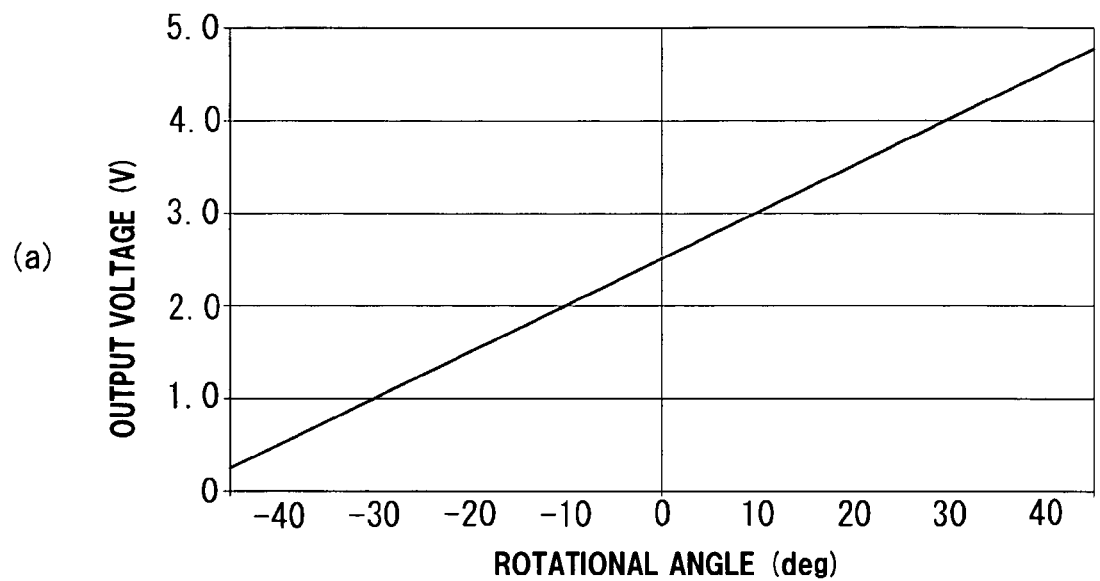
FIG. 9(A) is a graph explaining an output characteristic, that is, a relation between rotational angle and an output voltage of the rotational angle detecting sensor according to the comparative example.
FIG. 9(B) is a graph explaining an output characteristic, that is, a relation between a rotational angle and a linearity error of the rotational angle detecting sensor according to the comparative example.
Figure 9:
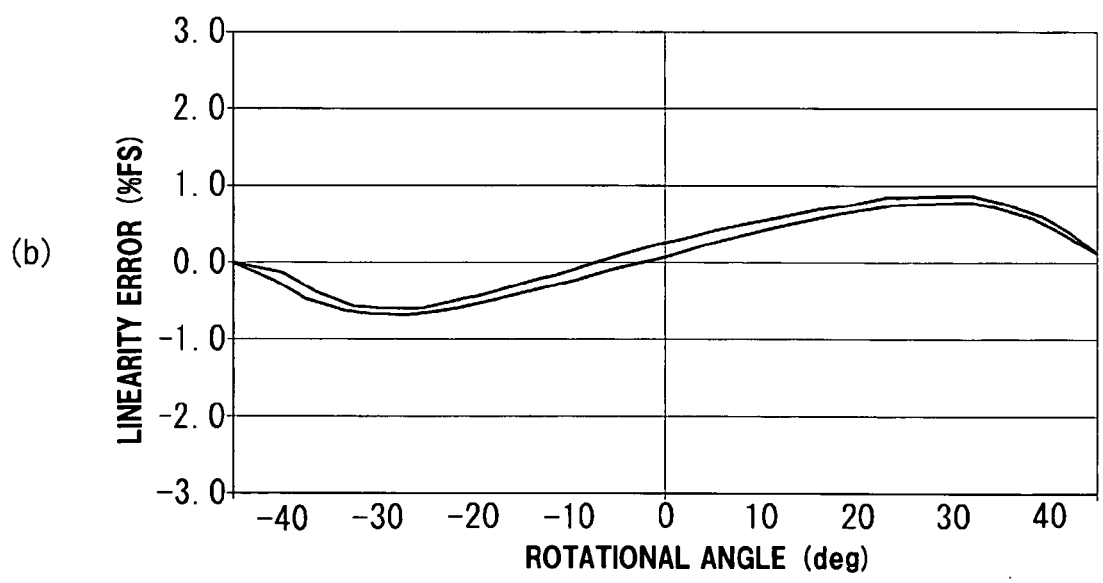

FIG. 8(A) is a graph explaining an output characteristic, that is, a relation between a rotational angle and an output voltage of the rotational angle detecting sensor according to the embodiment of the present invention. FIG. 8(B) is a graph explaining an output characteristic, that is, a relation between a rotational angle and a linearity error of the rotational angle detecting sensor according to the embodiment of the present invention. FIG. 9(A) is a graph explaining an output characteristic, that is, a relation between a rotational angle and an output voltage of the rotational angle detecting sensor according to the comparative example. FIG. 9(B) is a graph explaining an output characteristic, that is, a relation between a rotational angle and a linearity error of the rotational angle detecting sensor according to the comparative example.

For comparing the output characteristic of the rotational angle detecting sensor according to the embodiment with the output characteristic of the rotational angle detecting sensor according to the comparative example, the linearity error (% FS) and the hysteresis were compared.

Here, the linearity error (% FS) means a deviation amount between an ideal straight line and an actual measurement value and is calculated based upon the following formula (2).

$$\text{linearity error}(\% \, FS) = ((\text{measurement value} - \text{ideal value}) / \text{power source voltage}) \times 100 \quad (2)$$

The ideal straight line means a line connecting 0.3V (−45.0 degrees) of the output voltage of the hole IC 60 to 4.7V (45.0 degrees) thereof in the following case. That is, a position of the ring-shaped permanent magnet 20 in a case where a line connecting an N pole and an S pole in the ring-shaped permanent magnet 20 which is of the two-pole structure as a whole (a diameter line at right angles to a line component connecting the opposing surfaces of respective ends of the magnet semicircle portions 20a and 20b) is at a position passing through the gap 43 is made to 0 degrees, and as shown in FIG. 8(A), the rotational angle of the ring-shaped permanent magnet 20 is detected in a range from −45.0 degrees to 45.0 degrees.

In addition, the hysteresis (% FS) means the maximum deviation amount in the output voltage between the forward and backward routes within the detection angle range (range of the rotational angle from −45.0 degrees to 45.0 degrees) and is calculated based upon the following formula (3).

$$\text{Hysteresis}(\% \, FS) = ((\text{forward route output value} - \text{backward route output value}) / \text{power source voltage}) \times 100 \quad (3)$$

In a case of the comparative example shown in FIG. 9(A) and (B), the linearity error was ±1.46% FS and the hysteresis was 0.18% FS. On the other hand, in a case of the rotational angle detecting sensor according to the embodiment shown in FIGS. 8(A) and 8(B), the linearity error was ±0.78% FS and the hysteresis was 0.10% FS.

In consequence, it was confirmed that the rotational angle detecting sensor according to the embodiment was more excellent in linearity (output accuracy) and hysteresis than the comparative example.

Figure 10:
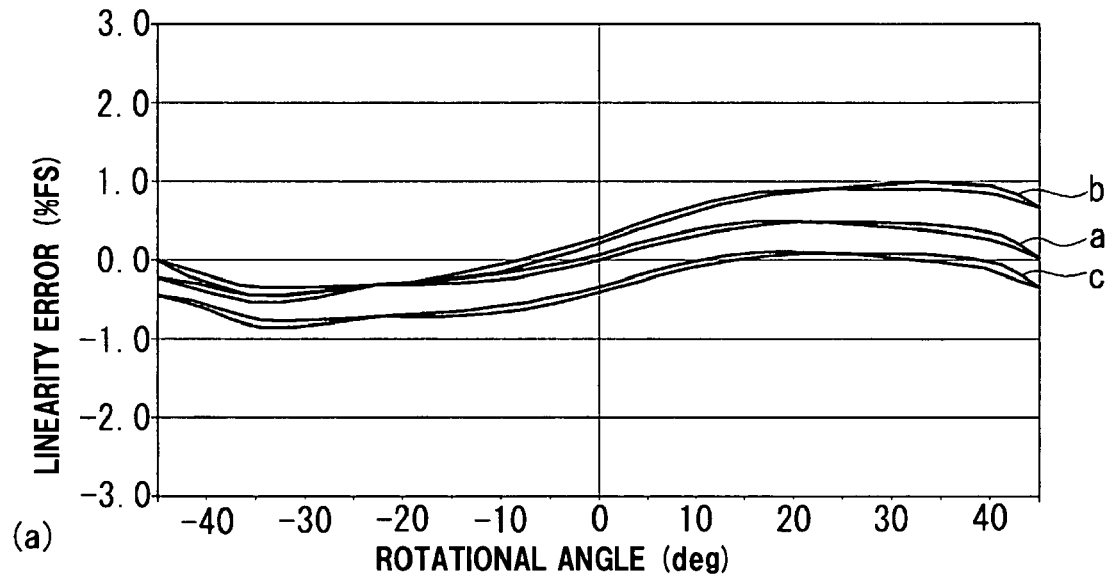
FIG. 10(A) is a graph explaining an output characteristic, that is, a relation between a rotational angle and a linearity error of the rotational angle detecting sensor where a rotational shaft of the rotor in the rotational angle detecting sensor is eccentric, according to the embodiment in the present invention.
FIG. 10(B) is a diagram explaining an eccentric direction of the rotational shaft of the rotor in the rotational angle detecting sensor according to the embodiment in the present invention.
Figure 10:
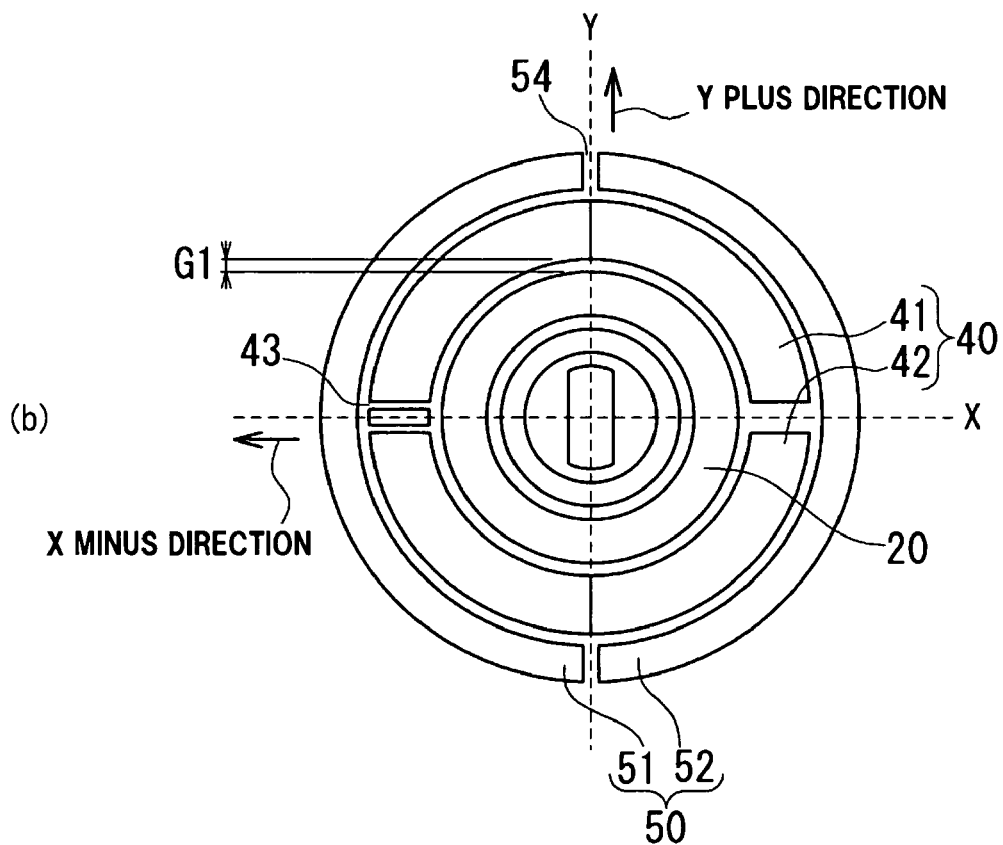

FIG. 10(A) is a graph explaining an output characteristic, that is, a relation between a rotational angle and a linearity error of the rotational angle detecting sensor where a rotational shaft of the rotor 10 in the rotational angle detecting sensor is eccentric, and FIG. 10(B) is a diagram explaining an eccentric direction of the rotational shaft.

A code "a" in FIG. 10(A) shows an output characteristic in which a rotational center of the rotor 10 is positioned at a central portion of the rotor 10, that is, the rotational shaft is not eccentric. A code "b" in FIG. 10(A) shows an output characteristic in which the rotational center of the rotor 10 is eccentric by 0.35 mm in a direction of the gap 54 (Y plus direction) of the outside magnetic flux collecting yoke 50. A code "c" in FIG. 10(A) shows an output characteristic in which the rotational center of the rotor 10 is eccentric by 0.35 mm in a direction of the gap 43 (Y minus direction) of the inside magnetic flux collecting yoke 40. Here, an eccentric amount of 0.35 mm corresponds to about 30% of the gap G1 between the ring-shaped permanent magnet 20 and the inside magnetic flux collecting yoke 40.

As shown in FIG. 10(A), even in a case where an eccentric amount of the position of the rotational center in the rotor 10 corresponds to about 30% of the gap G1, it is found out that the linearity error is restricted within ±1.0% FS.

In consequence, it is confirmed that the rotational angle sensor according to the embodiment is a sensor which is unlikely to be affected by eccentricity of the rotational shaft of the rotor 10.

Figure 11:
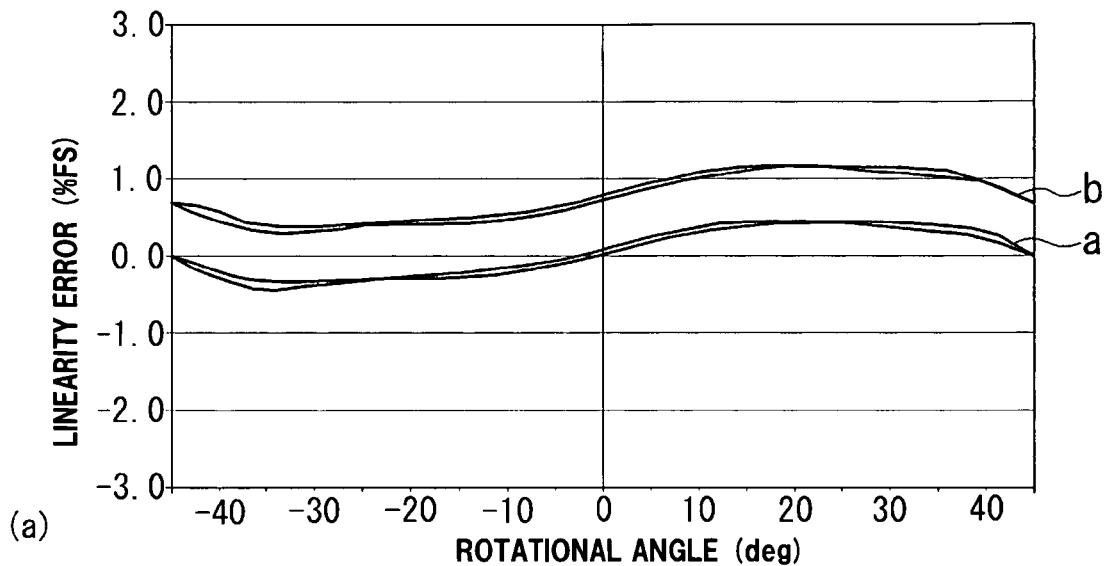
FIG. 11(A) is a graph explaining an output characteristic, that is, a relation between a rotational angle and a linearity error of the rotational angle detecting sensor where the magnetic flux is applied to the rotational angle detecting sensor from an outside, according to the embodiment in the present invention.
FIG. 11(B) is a diagram explaining an applying direction of the outside magnetic flux to the rotational angle detecting sensor according to the embodiment in the present invention.
Figure 11:
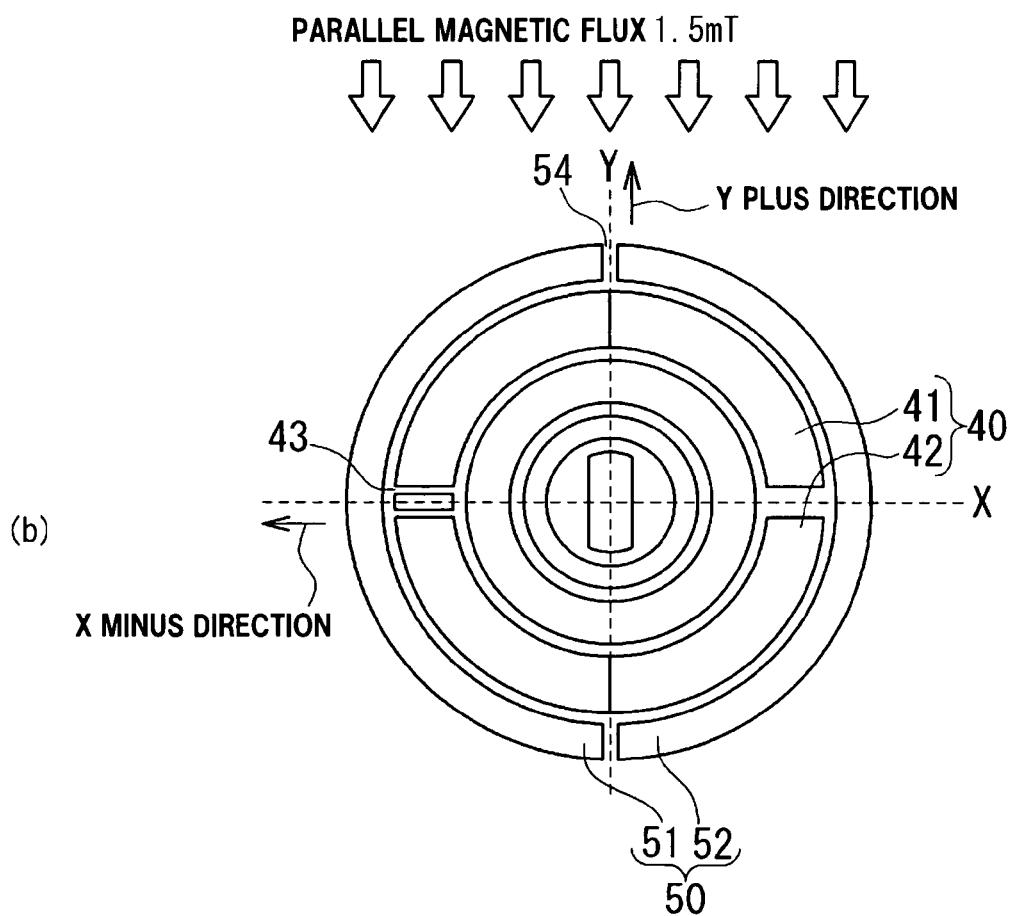
Figure 12:
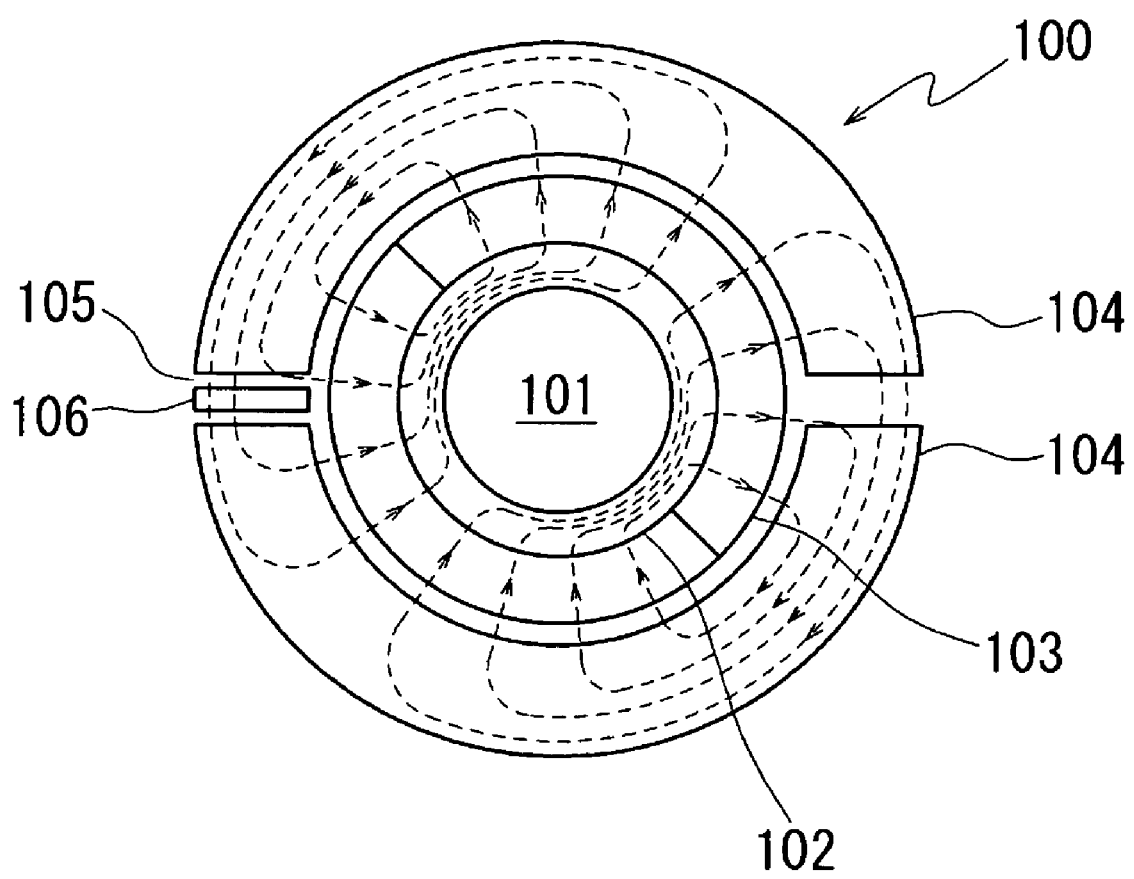
FIG. 12 is a diagram explaining a rotational angle detecting sensor according to the conventional example.

FIG. 11(A) is a graph explaining an output characteristic, that is, a relation between a rotational angle and a linearity error of the rotational angle detecting sensor where the magnetic flux is applied to the rotational angle detecting sensor from an outside. FIG. 11(B) is a diagram explaining an applying direction of the outside magnetic flux to the rotational angle detecting sensor.

A code "a" in FIG. 11(A) shows an output characteristic in which the outside magnetic flux is not applied. A code "b" in FIG. 11(A) shows an output characteristic in which the parallel magnetic flux of 1.5 mT from the direction of the gap 54 (Y plus direction) of the outside magnetic flux collecting yoke 50 toward the rotational center of the rotor 10.

As shown in FIG. 11(A), even in a case where the outside magnetic flux is applied, it is found out that the output variation is restricted within 0.7% FS.

In consequence, it is confirmed that the rotational angle sensor according to the embodiment is a sensor which is unlikely to be affected by the outside magnetic flux.

As described above, in the present embodiment, the non-contact rotational detecting sensor comprises the ring-shaped permanent magnet 20 which rotates integrally with the shaft (not shown) as the object for detecting the rotational angle and of which the magnetic pole changes along the circumferential direction, the inside magnetic flux collecting yoke 40 for surrounding the outer peripheral surface of the ring-shaped permanent magnet 20 in a constant gap, the ring-shaped magnetic flux collecting yoke 50 for surrounding the outer peripheral surface of the inside magnetic flux collecting yoke 40 in a constant gap, and the hole IC 60 arranged in the gap 43 formed in the inside magnetic flux collecting yoke 40, wherein the axial height of the inside magnetic flux collecting yoke 40 is changed along the circumferential direction so as to be higher at a position more distant from the gaps 43 and 44.

Therefore, the ratio of an amount of the magnetic flux passing through the gaps 43 and 44 to an amount of the magnetic flux not passing through the gaps 43 and 44 changes in accordance with rotation of the ring-shaped permanent magnet 20 and also a sum of the amount of the magnetic flux flowing in the inside magnetic flux collecting yoke 40 changes due to the change in the height of the inside magnetic flux collecting yoke 40. Therefore, since the output of the hole IC 60 is subject to the two changes, by determining the height (H2 and H3) of the inside magnetic flux collecting yoke 40 changing in the circumferential direction as needed, high linearity of the signal output to the rotational angle can be obtained.

Further, a practical detection angle range is enlarged by an improvement of the linearity. In addition, since the spaced distance G1 between the ring-shaped permanent magnet 20 and the inside magnetic flux collecting yoke 40 is constant, the present embodiment, being different from a case of making the ring shape to an elliptic shape or changing the spaced distance, can secure a stable quality without the possibility of the variations on the manufacture.

Further, the ring-shaped permanent magnet 20 is magnetized in parallel to a single diameter line to have an N pole and an S pole in the diameter direction as a whole.

Therefore, since the isotropic magnet which is inexpensive and excellent in workability can be adopted as the ring-shaped permanent magnet 20, the cost as the product can be reduced.

In addition, the gaps 43 and 44 of the inside magnetic flux collecting yoke 40 are configured to be formed between the first inside magnetic flux collecting yoke 41 and the second inside magnetic flux collecting yoke 42 formed by cutting down the circumferential opposing surfaces between the two magnetic flux collecting yoke semicircles obtained by dividing the ring-shaped magnetic flux collecting yoke along the diameter line. In consequence, since the gaps 43 and 44 are at positions of 180° in the circumferential direction, when the hole IC or the like is arranged at each of the gaps 43 and 44, the signal output in the same phase or reverse phase can be taken out as needed.

Further, the gaps 53 and 54 are formed in the outside magnetic flux collecting yoke 50. The gaps 53 and 54 of the outside magnetic flux collecting yoke 50 are configured to be formed between the first outside magnetic flux collecting yoke 51 and the second outside magnetic flux collecting yoke 52 formed by cutting down the circumferential opposing surfaces between the two magnetic flux collecting yoke semicircles obtained by dividing the ring-shaped magnetic flux collecting yoke along the diameter line. The gaps 43 and 44 and the gaps 53 and 54 are constructed to be provided at positions offset with each other in the circumferential direction as viewed in the axial direction. In consequence, since the stationary side yoke is a double system constructed of the inside magnetic flux collecting yoke 40 and the outside magnetic flux collecting yoke 50, there exists no cut in the stationary side yoke as viewed from the side of the ring-shaped permanent magnet 20. Accordingly, the leak magnetic flux in the outer diameter direction of the ring-shaped permanent magnet 20 can be restricted and also the output variation of the rotational angle detecting sensor where the rotational shaft of the rotor 10 is eccentric can be reduced.

Further, since the outside magnetic flux collecting yoke 50 serves as a magnetic shield which prevents the influence of the outside magnetic field from being made to the output of the rotational angle detecting sensor, the output variation in a case where the magnetic flux is applied from an outside is also reduced.

In addition, the inside magnetic flux collecting yoke 40 has one surface in the axial direction as a flat surface and the other surface as a slant surface, thereby changing the axial height along the circumferential direction. The axial maximum height of the inside magnetic magnet collecting yoke 40 is configured to be set equal to the axial height of the ring-shaped permanent magnet 20.

Therefore, the magnetic flux amount flowing via the outside magnetic flux collecting yoke 50 from the inside magnetic flux collecting yoke 40 changes in accordance with rotation of the ring-shaped permanent magnet 20 to change a sum of the magnetic flux amount flowing in the inside magnetic flux collecting yoke 40. Therefore, by determining a value of the height (H2 and H3) changing in the circumferential direction of the inside magnetic flux collecting yoke 40 by experiment measurements as needed, the output with an improved linearity can be obtained.

Further, the axial height (H4) of the outside magnetic flux collecting yoke 50 is constant over the entire circumference and is set higher than the axial height of the ring-shaped permanent magnet 20 or the axial maximum height (H3) of the inside magnetic flux collecting yoke 40.

Therefore, since the outside magnetic flux collecting yoke 50 absorbs a part of the leak magnetic flux, the hysteresis is reduced.

Here, the spaced distance G1 between the inside magnetic flux collecting yoke 40 and the ring-shaped permanent magnet 20 and the spaced distance G2 between the outside magnetic flux collecting yoke 50 and the inside magnetic flux collecting yoke 40 are constructed so that a value of G2/G1 is equal to 2 or less (here, G2>0).

Therefore, since the magnetic flux amount flowing via the outside magnetic flux collecting yoke 50 from the inside magnetic flux collecting yoke 40 changes in accordance with rotation of the ring-shaped permanent magnet 20 to change a sum of the magnetic flux amount flowing in the ring-shaped permanent magnet 20, the effect of correction of the output accuracy can be appropriately obtained.

The aforementioned embodiment explains a case where the axial height of the inside magnetic flux collecting yoke 40 changes along the circumferential direction to get higher at a position more distant from the gaps 43 and 44 as an example. However, as long as a sum of the magnetic flux passing through the inside magnetic flux collecting yoke 40 can be properly adjusted in accordance with a rotational angle of the ring-shaped permanent magnet 20, the axial height of the inside magnetic flux collecting yoke 40 may change along the circumferential direction to get lower at a position more distant from the gaps 43 and 44.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF THE CODES

10: ROTOR
12: MAGNET RETAINING PORTION
20: RING-SHAPED PERMANENT MAGNET
30: BACKYOKE
40: INSIDE MAGNETIC FLUX COLLECTING YOKE (FIRST YOKE)
41: FIRST INSIDE MAGNETIC FLUX COLLECTING YOKE (FIRST YOKE SEMICIRCLE PORTION)
42: SECOND INSIDE MAGNETIC FLUX COLLECTING YOKE (FIRST YOKE SEMICIRCLE PORTION)
43, 44: GAP
50: OUTSIDE MAGNETIC FLUX COLLECTING YOKE (SECOND YOKE)
51: FIRST OUTSIDE MAGNETIC FLUX COLLECTING YOKE (SECOND YOKE SEMICIRCLE PORTION)
52: SECOND OUTSIDE MAGNETIC FLUX COLLECTING YOKE (SECOND YOKE SEMICIRCLE PORTION)
53, 54: GAP
60: HOLE IC (MAGNETICALLY RESPONSIVE ELEMENT)

What is claimed is:

1. A non-contact rotational detecting sensor comprising:
a ring-shaped permanent magnet which rotates integrally with a detected element and of which a magnetic pole changes along a circumferential direction of the permanent magnet;
a ring-shaped first yoke for surrounding an outer peripheral surface of the ring-shaped permanent magnet in a constant gap;
a ring-shaped second yoke for surrounding an outer peripheral surface of the first yoke in a constant gap; and
a magnetically responsive element arranged in a gap formed in the first yoke, wherein:
an axial height of the first yoke changes along a circumferential direction of the first yoke.

2. A non-contact rotational detecting sensor according to claim 1, wherein:
a gap is formed in the second yoke; and
the gap of the first yoke and the gap of the second yoke are provided at positions offset with each other in the circumferential direction as viewed in the axial direction.

3. A non-contact rotational detecting sensor according to claim 1, wherein:
the ring-shaped permanent magnet is magnetized in parallel to a single diameter line to have an N pole and an S pole in the diameter direction as a whole.

4. A non-contact rotational detecting sensor according to claim 1, wherein:
the gap of the first yoke is formed by cutting down the circumferential opposing surfaces between two first yoke semicircles obtained by dividing the ring-shaped first yoke along the diameter line.

5. A non-contact rotational detecting sensor according to claim 1, wherein:
the gap of the second yoke is formed by cutting down the circumferential opposing surfaces between two second yoke semicircles obtained by dividing the ring-shaped second yoke along the diameter line.

6. A non-contact rotational detecting sensor according to claim 1, wherein:
the first yoke has one surface in the axial direction as a flat surface and the other surface as a slant surface, thereby changing an axial height of the first yoke along a circumferential direction thereof; and
an axial maximum height of the first yoke is set equal to an axial height of the ring-shaped permanent magnet.

7. A non-contact rotational detecting sensor according to claim 1, wherein:
an axial height of the second yoke is constant over an entire circumference of the second yoke and is set higher than an axial height of the ring-shaped permanent magnet.

8. A non-contact rotational detecting sensor according to claim 1, wherein:
an axial height of the second yoke is set higher than each of an axial height of the ring-shaped permanent magnet and the axial height of the first yoke.

9. A non-contact rotational detecting sensor according to claim 1, wherein:
a spaced distance G1 between the ring-shaped permanent magnet and the first yoke and a spaced distance G2 between the first yoke and the second yoke are set so that a value of G2/G1 is equal to 2 or less.

10. A non-contact rotational detecting sensor according to claim 2, wherein:
the ring-shaped permanent magnet is magnetized in parallel to a single diameter line to have an N pole and an S pole in the diameter direction as a whole.

11. A non-contact rotational detecting sensor according to claim 2, wherein:
the gap of the first yoke is formed by cutting down the circumferential opposing surfaces between two first yoke semicircles obtained by dividing the ring-shaped first yoke along the diameter line.

12. A non-contact rotational detecting sensor according to claim 3, wherein:
the gap of the first yoke is formed by cutting down the circumferential opposing surfaces between two first yoke semicircles obtained by dividing the ring-shaped first yoke along the diameter line.

13. A non-contact rotational detecting sensor according to claim 2, wherein:
the gap of the second yoke is formed by cutting down the circumferential opposing surfaces between two second yoke semicircles obtained by dividing the ring-shaped second yoke along the diameter line.

14. A non-contact rotational detecting sensor according to claim 3, wherein:
the gap of the second yoke is formed by cutting down the circumferential opposing surfaces between two second yoke semicircles obtained by dividing the ring-shaped second yoke along the diameter line.

15. A non-contact rotational detecting sensor according to claim 4, wherein:
the gap of the second yoke is formed by cutting down the circumferential opposing surfaces between two second yoke semicircles obtained by dividing the ring-shaped second yoke along the diameter line.

16. A non-contact rotational detecting sensor according to claim 2, wherein:
the first yoke has one surface in the axial direction as a flat surface and the other surface as a slant surface, thereby changing an axial height of the first yoke along a circumferential direction thereof; and
an axial maximum height of the first yoke is set equal to an axial height of the ring-shaped permanent magnet.

17. A non-contact rotational detecting sensor according to claim 3, wherein:
the first yoke has one surface in the axial direction as a flat surface and the other surface as a slant surface, thereby changing an axial height of the first yoke along a circumferential direction thereof; and
an axial maximum height of the first yoke is set equal to an axial height of the ring-shaped permanent magnet.

18. A non-contact rotational detecting sensor according to claim 4, wherein:
the first yoke has one surface in the axial direction as a flat surface and the other surface as a slant surface, thereby changing an axial height of the first yoke along a circumferential direction thereof; and
an axial maximum height of the first yoke is set equal to an axial height of the ring-shaped permanent magnet.

19. A non-contact rotational detecting sensor according to claim 5, wherein:
the first yoke has one surface in the axial direction as a flat surface and the other surface as a slant surface, thereby changing an axial height of the first yoke along a circumferential direction thereof; and
an axial maximum height of the first yoke is set equal to an axial height of the ring-shaped permanent magnet.

20. A non-contact rotational detecting sensor according to claim 2, wherein:
an axial height of the second yoke is constant over an entire circumference of the second yoke and is set higher than an axial height of the ring-shaped permanent magnet.

21. A non-contact rotational detecting sensor according to claim 3, wherein:
an axial height of the second yoke is constant over an entire circumference of the second yoke and is set higher than an axial height of the ring-shaped permanent magnet.

22. A non-contact rotational detecting sensor according to claim 4, wherein:
an axial height of the second yoke is constant over an entire circumference of the second yoke and is set higher than an axial height of the ring-shaped permanent magnet.

23. A non-contact rotational detecting sensor according to claim 5, wherein:
an axial height of the second yoke is constant over an entire circumference of the second yoke and is set higher than an axial height of the ring-shaped permanent magnet.

24. A non-contact rotational detecting sensor according to claim 6, wherein:
an axial height of the second yoke is constant over an entire circumference of the second yoke and is set higher than an axial height of the ring-shaped permanent magnet.

25. A non-contact rotational detecting sensor according to claim 2, wherein:
an axial height of the second yoke is set higher than each of an axial height of the ring-shaped permanent magnet and the axial height of the first yoke.

26. A non-contact rotational detecting sensor according to claim 3, wherein:
an axial height of the second yoke is set higher than each of an axial height of the ring-shaped permanent magnet and the axial height of the first yoke.

27. A non-contact rotational detecting sensor according to claim 4, wherein:
an axial height of the second yoke is set higher than each of an axial height of the ring-shaped permanent magnet and the axial height of the first yoke.

28. A non-contact rotational detecting sensor according to claim 5, wherein:
an axial height of the second yoke is set higher than each of an axial height of the ring-shaped permanent magnet and the axial height of the first yoke.

29. A non-contact rotational detecting sensor according to claim 6, wherein:
an axial height of the second yoke is set higher than each of an axial height of the ring-shaped permanent magnet and the axial height of the first yoke.

30. A non-contact rotational detecting sensor according to claim 7, wherein:
an axial height of the second yoke is set higher than each of an axial height of the ring-shaped permanent magnet and the axial height of the first yoke.

31. A non-contact rotational detecting sensor according to claim 2, wherein:
a spaced distance G1 between the ring-shaped permanent magnet and the first yoke and a spaced distance G2 between the first yoke and the second yoke are set so that a value of G2/G1 is equal to 2 or less.

32. A non-contact rotational detecting sensor according to claim 3, wherein:
a spaced distance G1 between the ring-shaped permanent magnet and the first yoke and a spaced distance G2 between the first yoke and the second yoke are set so that a value of G2/G1 is equal to 2 or less.

33. A non-contact rotational detecting sensor according to claim 4, wherein:
a spaced distance G1 between the ring-shaped permanent magnet and the first yoke and a spaced distance G2 between the first yoke and the second yoke are set so that a value of G2/G1 is equal to 2 or less.

34. A non-contact rotational detecting sensor according to claim 5, wherein:
a spaced distance G1 between the ring-shaped permanent magnet and the first yoke and a spaced distance G2 between the first yoke and the second yoke are set so that a value of G2/G1 is equal to 2 or less.

35. A non-contact rotational detecting sensor according to claim 6, wherein:
   a spaced distance G1 between the ring-shaped permanent magnet and the first yoke and a spaced distance G2 between the first yoke and the second yoke are set so that a value of G2/G1 is equal to 2 or less.

36. A non-contact rotational detecting sensor according to claim 7, wherein:
   a spaced distance G1 between the ring-shaped permanent magnet and the first yoke and a spaced distance G2 between the first yoke and the second yoke are set so that a value of G2/G1 is equal to 2 or less.

37. A non-contact rotational detecting sensor according to claim 8, wherein:
   a spaced distance G1 between the ring-shaped permanent magnet and the first yoke and a spaced distance G2 between the first yoke and the second yoke are set so that a value of G2/G1 is equal to 2 or less.

* * * * *